No. 674,665. Patented May 21, 1901.
J. C. BLEVNEY.
POWER TRANSMITTING MEANS FOR HORSELESS CARRIAGES.
(Application filed Jan. 22, 1901.)
(No Model.) 3 Sheets—Sheet 3.

WITNESSES:
Henry Krug
Russell M. Averett

INVENTOR
John C. Blevney,
BY
Drake T G
ATTORNEYS.

UNITED STATES PATENT OFFICE.

JOHN C. BLEVNEY, OF NEWARK, NEW JERSEY.

POWER-TRANSMITTING MEANS FOR HORSELESS CARRIAGES.

SPECIFICATION forming part of Letters Patent No. 674,665, dated May 21, 1901.

Application filed January 22, 1901. Serial No. 44,248. (No model.)

*To all whom it may concern:*

Be it known that I, JOHN C. BLEVNEY, a citizen of the United States, residing at Newark, in the county of Essex and State of New Jersey, have invented certain new and useful Improvements in Power-Transmitting Means for Horseless Carriages; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The objects of this invention are to enable a more uniform, smooth, or regular forward movement of the vehicle to be obtained and to prevent the irregularity of movement occasioned heretofore by the independent vibrations of the body of the vehicle, carrying the engine and boiler, upon the springs of the said vehicle, to secure a more direct and regular transmission of power from the engine to the driving-wheel of the vehicle, to reduce the cost of construction, to reduce the complexity and multiplicity of parts, and to secure other advantages and results, some of which may be referred to hereinafter in connection with the description of the working parts.

The invention consists in the improved means for transmitting power in a horseless carriage from the boiler to the vehicle driving wheel or wheels, in the peculiar arrangement of the engine and connections, and in the arrangements and combinations of parts of the same, all substantially as will be hereinafter set forth and finally embraced in the clauses of the claim.

Figure 1:
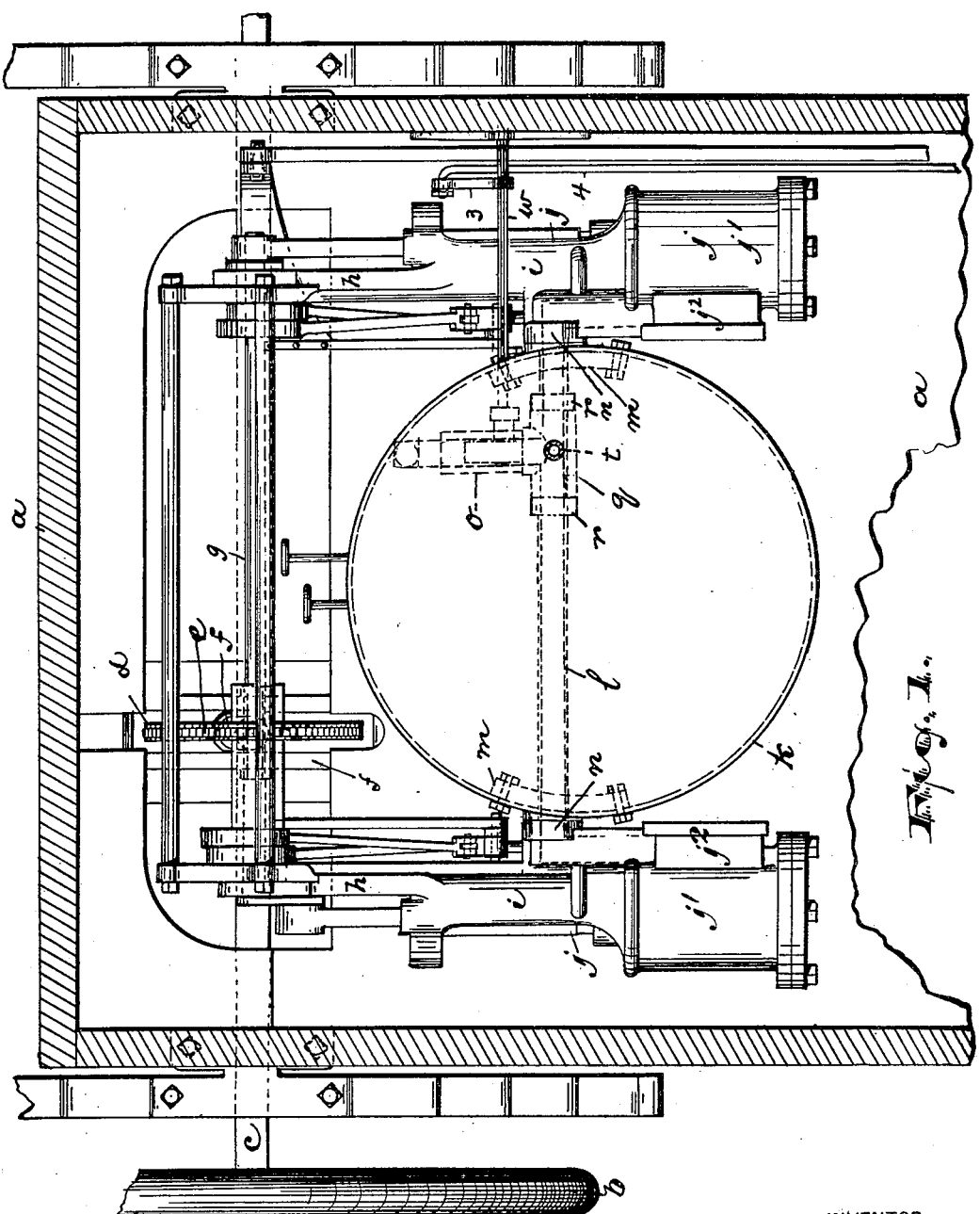
Figure 2:
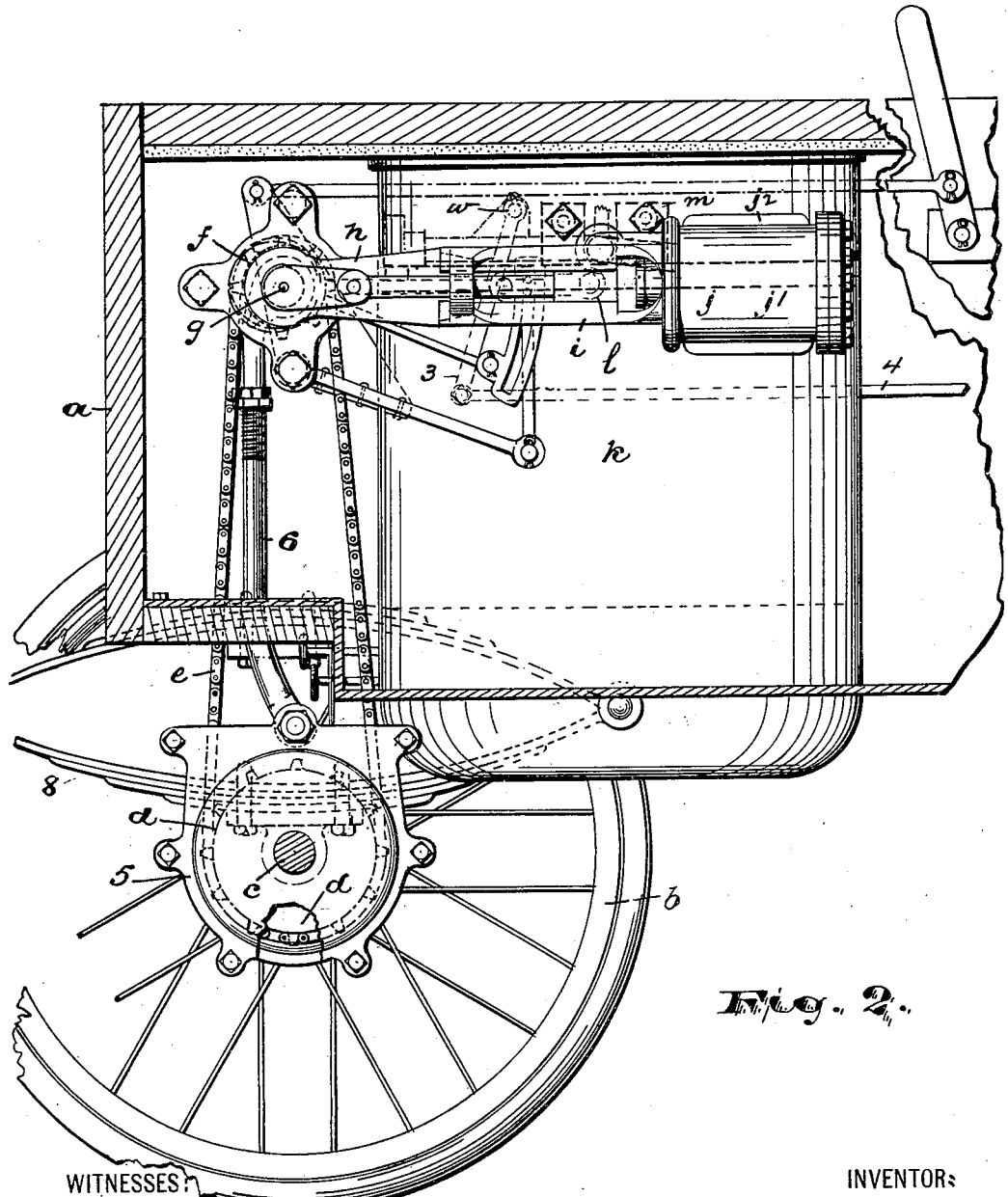
Figure 3:
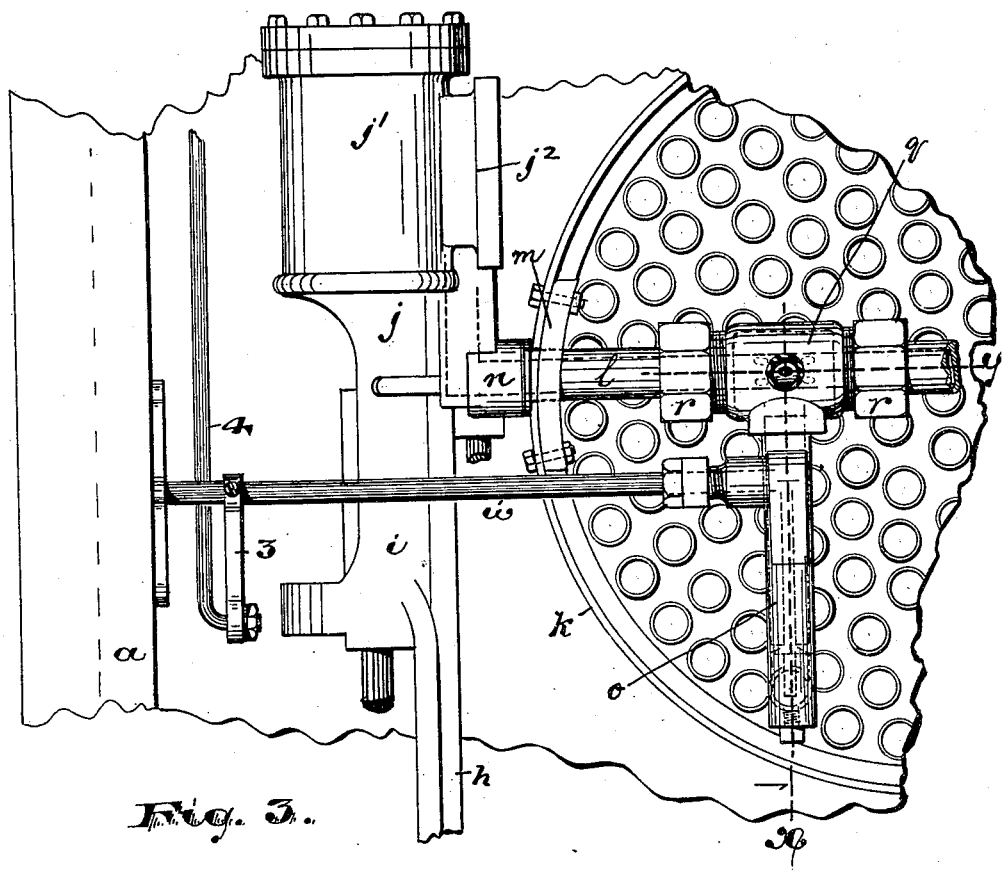
Figure 4:
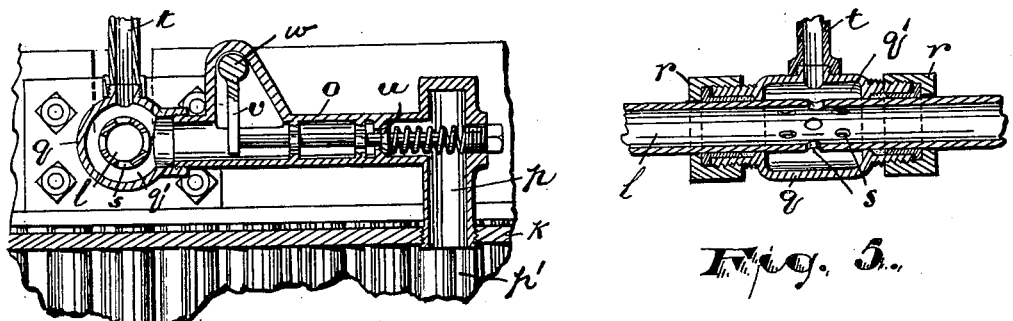
Figure 5:
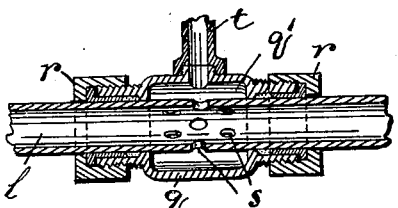

Referring to the accompanying drawings, in which like characters of reference indicate corresponding parts in each of the several views, Figure 1 is a plan of a portion of a vehicle having my improvements. Fig. 2 is a side elevation of the said improvements, the body of the vehicle being in vertical section. Fig. 3 is a detail plan showing more clearly the means for pivotally supporting the engine on the boiler and conveying the steam from the boiler to said pivotally-supported engine. Fig. 4 is a sectional view taken at line $x$ of Fig. 3, and Fig. 5 is a view taken at line $y$ of Fig. 3.

In said drawings, $a$ indicates the body of a vehicle, and $b$ is the driving-wheel thereof, the said wheel $b$ being fixed upon the axle $c$ and the said axle being provided with a sprocket-wheel $d$, fixed thereon or connected therewith by gearing in any suitable manner. Power is transmitted to said sprocket-wheel by a chain $e$, extending up through a suitable opening or openings in the bottom of the vehicle to a small sprocket-wheel $f$, fixed upon a crank-shaft $g$, having bearings in arms $h$ of the bed-frame or casting $i$ of the pivoted engines $j$ $j$, arranged at opposite sides of the vehicle. The said engines $j$ are arranged at opposite sides of the furnace or casing $k$ and approximately midway of the lengths of the said frames are pivoted or swiveled upon the ends of the steam-pipe $l$, supported by the furnace or boiler, the outer shell of the furnace or boiler being provided with bearing-blocks $m$, which stiffen said shell and provide boxes or bearings for the pivotal pipe $l$ at its opposite ends. The frame or body-casting $i$ of each of the engines is provided with a hub $n$ to receive the end of the pipe $l$, the said hub being preferably threaded and the ends of the said pipe $l$ being correspondingly threaded. The castings $i$ being secured upon the opposite ends of said pipe $l$, the two castings, with the pipe, are adapted to move pivotally together, as will be understood. The said pipe $l$ serves as a steam-supply pipe for the two engines, the steam entering the said pivotal pipe from the valved throttle $o$ in open communication through the branch $p$, Fig. 4, with the steam-chamber $p'$ of the boiler. The said throttle is provided with a cross-head $q$ at one extremity, through which the said pipe $l$ extends, the said cross-head and the pivotal steam-pipe being imperviously joined by means of suitable packing-boxes $r$ at the opposite ends of said cross-heads of any suitable construction. The centers of the cross-heads $q$ are larger in diameter than the said pipe $l$ and form steam-chambers $q'$, Fig. 5, around said pipe, and said pipe $l$ within said chamber $q'$ is perforated, as at $s$, to permit the inflow of steam from the throttle into said pipe. The throttle at said cross-head is also provided with an oil-supply pipe $t$, connected with a lubricator of any ordinary construction, the said pipe $t$ permitting an inflow of steam therethrough to said lubricator, so that the condensation of the steam will gradually take the place of oil, and the latter will flow through said pipe to supply the pipe $l$ and the engine with lubricating-oil. The engine thus supplied with steam through the pipe $l$ is operated in any ordinary manner. The throttle $o$ is provided with a valve $u$, which is operated by a lever-arm $v$, arranged in connection with the shaft $w$, lever-arm 3, and operating-rod 4, which last extends to a point convenient for the driver and is operated in any suitable manner.

The hubs $n$, Fig. 3, are formed at or approximately at the centers of gravity of the castings $i$ of the engines $j$ and their connections, so that the weight of the cylinders $j'$ of said engines and steam-chests $j^2$ and contents will about counterbalance the weight of the parts of the bed-frame or castings $i$ at the opposite side of the hub, the arms $h$, and their attachments.

The free ends of the arms $h$ of the castings $i$ are connected together and are connected to the axle $c$ or to the sprocket-wheel cover or casing 5, held to the said axle by means of a vertical strut comprising a connecting-rod 6 and the casing 5, the said rod being preferably in sections adjustable in relation to one another, one section being attached to the said arm $h$ and the other to the casing 5, so that the chain $e$ may be properly stretched or loosened at will, the said sections of the connecting-rod 6 being threaded or provided with adjusting means in any suitable manner.

By the construction thus described I secure a horizontal or approximately horizontal arrangement of the engine within the body of the vehicle and a directly vertical transmission of power to the axle, so that the power-transmitting means at the axle may be entirely inclosed below the flooring of the body. The engine and immediate connections may also be inclosed above the flooring and within the body, so that access of dust and dirt is prevented and withal a very compact arrangement is secured by which a cumbersome outside appearance is avoided.

The movement of the body $a$ on the springs 8 is permitted by the pivoted engines, the strut holding the axle, crank-shaft of the engine, and connections in operative relation.

Having thus described the invention, what I claim as new is—

1. In a horseless carriage, the combination with the body of the vehicle, and the driving-wheel thereof fixed upon an axle having a sprocket-wheel, and the said body being seated upon springs supported upon said axle, of a boiler and furnace supported on said vehicle-body, an engine receiving its power from said boiler and pivotally supported on said furnace, near the top thereof, the bed-frame of said engine extending horizontally to a point above the axle of the driving-wheel of the carriage, a strut, holding the axle and one of the free ends, of the engine in fixed relation and means for transmitting power from said engine to the said sprocket and driving wheels, substantially as set forth.

2. In a horseless carriage, the combination with the body, axle and driving-wheel, said body having a differential vibration or movement with relation to said axle, of a swinging or pivotally-movable engine, the frame of which is arranged horizontally above the horizontal plane of the axle of the driving-wheel, and extending at one end to a point above said axle and at said end being free, and a strut connecting the free end of the engine to the axle and means for transmitting power from the engine to the axle, substantially as set forth.

3. In a horseless carriage, the combination with the wheeled body, a boiler and a furnace, of a pair of engines pivoted at the opposite ends of a tube or pipe in open communication with the boiler and means for transmitting power from said engines to the wheels of said carriage, substantially as set forth.

4. In a horseless carriage, the combination with the vehicle-body, axle, and driving-wheel, of a pair of engines disposed horizontally above the floor or bed-plate of said body, said engines being pivoted about midway of their lengths approximately at the centers of gravity of said engines, one of the free ends of each of said engines being disposed vertically above the axle of the driving-wheel, a strut holding said free end in operative relation to said axle, and means for transmitting power from said engine to said axle, substantially as set forth.

5. In a horseless carriage, the combination with the vehicle-body, the driving-wheel and its axle, of a pair of engines disposed horizontally above the bed-plate of the vehicle-body, a free end of each of said engines being connected to said axle by connections extending downward to the said axle, substantially as set forth.

6. In a horseless carriage, the combination with the wheeled vehicle-body having thereon a furnace and boiler, the latter having a horizontal steam-pipe at the top in communication with the steam-chamber of the said boiler, engines disposed horizontally at opposite sides of the furnace and receiving steam from said boiler and having a pivotal independence of movement and means connecting the free ends of the engines with the axle of the wheels of the vehicle, substantially as set forth.

7. In a horseless carriage, the combination with the wheeled vehicle-body having therein a furnace and boiler, the latter having a steam-pipe at the top extending out at the opposite sides of the boiler, engines pivoted upon said steam-pipes and receiving steam therefrom, said engines extending horizontally to a point approximately virtually above the axle of the wheel and thereat having power-transmitting means extending down to said axle, substantially as set forth.

8. In a horseless carriage, the combination with the wheeled vehicle-body having thereon a furnace and boiler, the latter having steam pipes or ducts extending out at the sides of the furnace, and thereat receiving and pivotally supporting a pair of horizontally-disposed engines, a strut for holding the free end of the engine and axle of the wheel in fixed relation to one another and means for communicating power downward from the free end of the engine to the said axle of the wheel, substantially as set forth.

9. In combination, the wheeled body, cover or casing 5, through which the axle of the wheel extends, sprocket-wheel on said axle, chain $e$, extending upward to coöperating sprocket-wheel carried by the bed-plate or frame of the engine, means connecting the pistons of the engines with the last said sprocket-wheel, and connecting-rod 6, joining the casing and bed-frame of the engines, substantially as set forth.

In testimony that I claim the foregoing I have hereunto set my hand this 29th day of December, 1900.

JOHN C. BLEVNEY.

Witnesses:
CHARLES H. PELL,
RUSSELL M. EVERETT.